Nov. 11, 1947.   A. R. BROWN   2,430,449
COUPLING FOR ROTARY MEMBERS
Filed May 13, 1944

WITNESSES
E. H. Lutz
D. E. Carth

INVENTOR
ARTHUR R. BROWN.
BY
ATTORNEY

Patented Nov. 11, 1947

2,430,449

UNITED STATES PATENT OFFICE 2,430,449

COUPLING FOR ROTARY MEMBERS

Arthur R. Brown, Wilbraham, Mass., assignor to Westinghouse Electric Corporation, East Pittsburgh, Pa., a corporation of Pennsylvania Application May 13, 1944, Serial No. 535,497

4 Claims. (Cl. 64—15)

1

The invention relates to a power-transmitting coupling and it has for an object to provide apparatus of this character permitting of relative axial and angular displacements of two coupled members without appreciable variation in the relative speed of the members.

A further object of the invention is to provide a power-transmitting coupling which is flexible to permit of relative axial and angular displacements of the coupled members together with means for protecting the coupling against injury incident to handling or connecting and disconnecting it with respect to members coupled thereby.

Yet another object of the invention is to provide a flexible coupling having one member formed for face attachment to a gear or the like and the other member providing with a hub for attachment to a shaft.

These and other objects are effected by the invention as will be apparent from the following description and claims taken in connection with the accompanying drawing, forming a part of this application in which:

Figure 1:
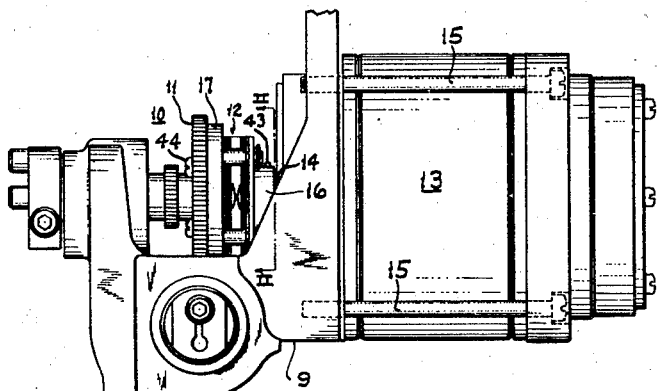
Fig. 1 is a fragmentary view of apparatus showing the improved coupling applied thereto.
Figure 2:
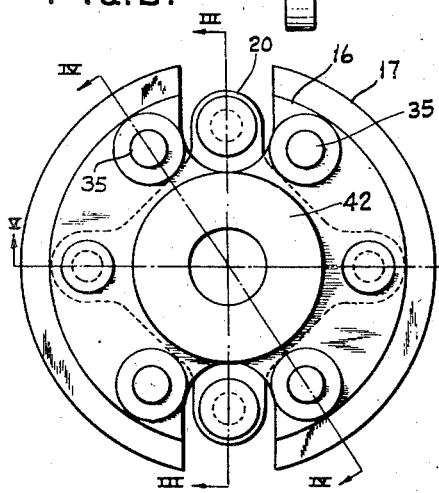
Fig. 2 is an end elevational view of the improved coupling, as seen from line II—II of Fig. 1.
Figures 3, 4:
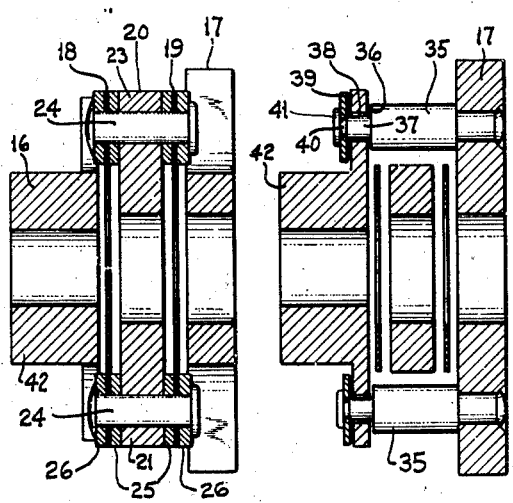
Fig. 3 is a section taken on line III—III of Fig. 2.
Fig. 4 is a section taken on line IV—IV of Fig. 2.
Figure 5:
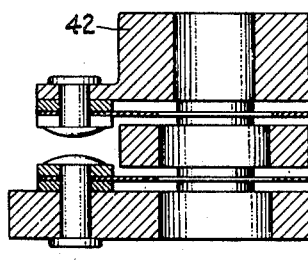
Fig. 5 is a section taken on the line V—V of Fig. 2.
Figure 6:
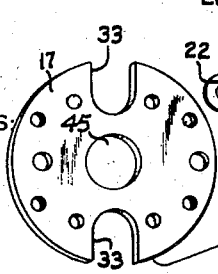
Fig. 6 is an exploded perspective view of elements of the coupling, omitting the washers and pins.

In the drawings, there is shown housing or supporting structure 9 carrying mechanism, at 10, including a gear 11 connected by the improved coupling, at 12, to the synchronous transmitter 13 also carried by the supporting structure and having a shaft 14. In this arrangement, it is desirable that the coupling, at 12, and the transmitter 13 shall be constructed and arranged readily to permit removal and replacement of the transmitter and the coupling as a unit with accommodation for manufacturing tolerances and deviations of the transmitter shaft with respect to the element or gear 11 without appreciable adverse effect on the speed or position of the synchronous transmitter rotor with respect to the gear train to which the coupling is attached. Therefore, the transmitter is connected to the supporting structure by screws 15 and the coupling, at 12, is constructed and arranged to provide for displacement of the coupled members both axially and angularly without appreciable variation in relative speed of the members. Also, the coupling, at 12, incorporates means for preventing damage in handling without affecting its freedom of normal operation.

The coupling, at 12, includes a coupling member or collar 16 connected flexibly to the collar 17 so as to permit of relative axial and angular displacements thereof without appreciable variation in the relative speed of the members to which the collars are attached.

A flexible connection is interposed between the collars 16 and 17; and, to this end, there are shown flexible webs 18 and 19 attached to the collars 16 and 17 and separated by a spacing element 20.

The webs 18 and 19 each have a first pair of oppositely-extending radial arms 21, 21 and a second pair of oppositely-extending radial arms 22, 22. The spacing element 20 has oppositely-extending radial arms 23, 23. The flexible web radial arms 21 of the webs 18 and 19 align with the spacing element arms 23 and are connected thereto by means including rivets 24 so that the arms 21 are in spaced relation to the spacing element arms 23, such spacing preferably being secured by the interposition of washers 25 between the web arms and the spacing element arm. Also, washers 26 are preferably arranged between the headed ends 27 of the rivets and the web arms.

The web arms 22 of the intermediate flexible assembly are connected to the collars 16 and 17 so as to be in spaced relation with respect thereto. As shown, these arms are connected by means including rivets 28 carried by the collars and having heads 29, a washer 30 being interposed between each head 29 and a flexible arm 22 and a washer 31 being arranged between the latter and the adjacent collar.

To provide for accommodation of the rivet heads 29 of the flexible connecting assembly without interference with the collars, the latter are preferably provided with oppositely-extending radial slots 32 and 33 providing for such accommodation.

The coupling is protected against the possibility of injury due to excessive displacement of the collars in handling. Preferably, this purpose is achieved by providing the collar 16 with a plurality of pins 35 attached thereto, having shoulders or abutments 36 and neck portions 37 extending outwardly therefrom and loosely through openings 38 formed in the collar 17. Washers 39 are mounted on tenons 40 at the outer ends of the pins and are retained in place by tenon heads 41. The shoulders 36 and the washers 39 serve as abutments limiting relative axial displacement of the collars to avoid injury to the flexible connecting assembly. Further, the pins also safeguard the coupling against injury due to relative angular displacement effects incident to handling, by the limited clearance between the openings 38 in the collar 16 and the neck 37 of pins 35.

As shown, the coupling has the collar 17 arranged for face attachment with respect to a gear 11 while the collar 16 has a hub 42 for attachment to the shaft 14 in any suitable manner, such as a taper pin 43 (Fig. 1). The collar 16 may be attached to the gear in any suitable manner, as by screws 44 carried by the collar 17 extending through openings formed in the gear 11.

To avoid interference on account of protruding shaft end or ends, the various coupling elements have central openings. Therefore, the collar 17, the cruciform webs 18 and 19, and the spacing element 20 interposed between the webs have aligned central openings 45, 46 and 47 providing a space for accommodation of shaft end or ends.

From the structure described, it will be apparent that the cruciform metallic webs 18 and 19 provide for relative axial displacement of the members coupled, this purpose being served by flexure of the spring arms 21 and 22. Angular displacement of the members coupled is accommodated by warping of the spring arms. Furthermore, because of the flexible features, the coupling is capable of accommodating for manufacturing tolerances and deviations between the shaft 14 and the gear 11 without appreciable adverse effect on the speed or position of apparatus such as the transmitter 13.

What is claimed is:

1. In a coupling, a pair of collars for attachment to members to be coupled, an intermediate spacing element; flexible webs disposed between the collars and the spacing element and each having first and second pairs of oppositely-extending radial arms arranged at right angles; means for attaching the first pairs of oppositely-extending radial arms to the spacing element with the arms spaced from the latter and disposed in aligned relation; means for attaching the second pairs of oppositely-extending radial arms to the coupling members with the arms spaced from the latter and disposed in aligned relation; and means for protecting the coupling against injury including pins fastened to one of the coupling members, extending loosely through openings formed in the other coupling member, and provided with spaced abutments cooperating with the latter to limit relative axial movement of the coupling members.

2. In a coupling, a pair of collars for attachment to members to be coupled and each collar having oppositely-extending radial slots formed therein, an intermediate spacing element having oppositely-extending radial arms; flexible webs disposed between the collars and the spacing element and having first and second pairs of oppositely-extending radial arms arranged at right angles; means including rivets for attaching the first pairs of oppositely-extending radial arms of the webs to the oppositely-extending radial arms of the spacing element with the web arms spaced from the spacing element arms and the ends of the rivets disposed in said collar slots; means including rivets for attaching the second pairs of oppositely-extending radial arms of the webs to the collars with the arms spaced from the latter; and means for protecting the coupling against injury due to excessive relative axial displacement of the collars comprising pins carried by one of the collars, extending loosely through openings formed in the other collar, and having spaced abutments cooperating with the latter collar to limit relative axial displacement of the collars.

3. In a coupling, a pair of collars for attachment to members to be coupled and provided with central openings and oppositely-extending radial slots; an intermediate spacing element of annular form with oppositely-extending radial arms; flexible webs disposed between the collars and the spacing element and each having a central opening and first and second pairs of oppositely-extending radial arms arranged at right angles; means including rivets for attaching the first pairs of radial arms of the webs to the spacing element radial arms in spaced relation with respect to the latter and the rivets having their ends disposed in the collar slots; means including rivets for attaching the second pairs of arms of the flexible webs to the collars in spaced relation with respect to the latter; and means for protecting the coupling against injury due to excessive relative axial movement of the coupling members including pins attached to one of the coupling members, extending loosely through openings formed in the other coupling member, and provided with abutments cooperating with the latter coupling member to limit relative axial displacement of the coupling members.

4. In a coupling, a first collar provided with means for face attachment thereof to a suitable member; a second collar having a hub for attachment to a shaft; an intermediate spacing element having oppositely-extending radial arms; flexible webs disposed between the collars and the spacing element and each having first and second pairs of oppositely-extending radial arms arranged at right angles; means including rivets for attaching the first pairs of web arms to the spacing element arms in spaced relation with respect to the latter; means including rivets for attaching the second pairs of web arms to the coupling members in spaced relation with respect to the latter; and means for protecting the coupling against injury due to excessive axial displacement of the coupling members including pins attached to the first coupling member, extending loosely through openings formed in the second coupling member, and provided with abutments cooperating with the latter coupling member to limit relative axial displacement of the coupling members.

ARTHUR R. BROWN.

REFERENCES CITED

The following references are of record in the file of this patent:

UNITED STATES PATENTS

| Number | Name | Date |
|---|---|---|
| 1,455,242 | Corgiat | May 15, 1923 |
| 1,639,644 | Baumann | Aug. 23, 1927 |
| 2,287,391 | Musselman | June 23, 1942 |
| 1,188,113 | Thomas | June 20, 1916 |
| 1,326,993 | Thomas | Jan. 6, 1920 |
| 1,402,688 | Travis | Jan. 3, 1922 |
| 2,182,711 | Thomas | Dec. 5, 1939 |

FOREIGN PATENTS

| Number | Country | Date |
|---|---|---|
| 417,784 | France | 1910 |
| 172,178 | Great Britain | Dec. 8, 1921 |
| 613,940 | France | Sept. 6, 1926 |
| 188,066 | Great Britain | Oct. 30, 1922 |